Oct. 3, 1933.  E. RIETSCH  1,929,260
ELECTRIC RESISTANCE WELDING MACHINE
Filed March 11, 1932
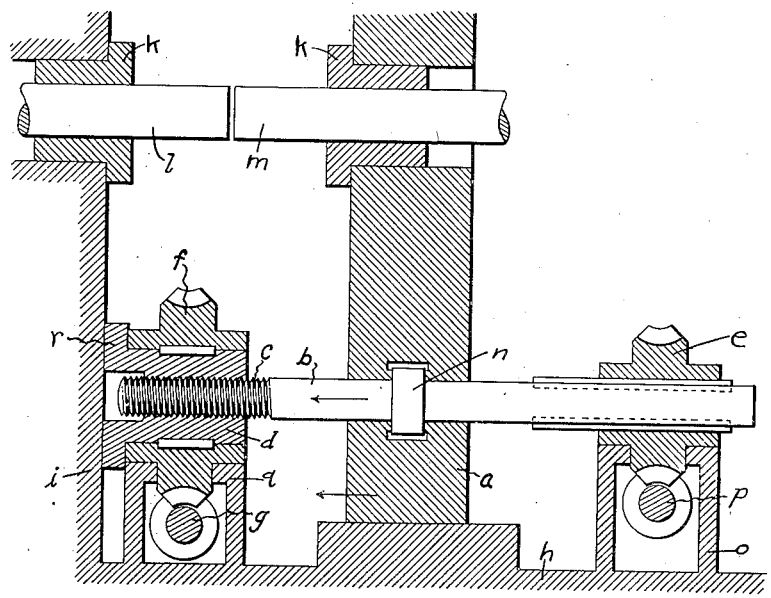
Inventor:
Eberhard Rietsch
by Charles E. Tullar
His Attorney.

UNITED STATES PATENT OFFICE 1,929,260

ELECTRIC RESISTANCE WELDING MACHINE

Eberhard Rietsch, Berlin - Hennigsdorf, Germany, assignor to General Electric Company, of New York Application March 11, 1932, Serial No. 598,540, and in Germany March 12, 1931

4 Claims. (Cl. 219—4)

My invention relates to automatic welding by the electric fusion-resistance process. It is an object of my invention to provide a machine for performing this process which is more adaptable to varying conditions than are the welding machines heretofore designed.

It has already been proposed to equip welding machines with a work-holding carriage and a cam plate for feeding it, the feeding velocity being varied during welding by means of the cam plate, the initial or fusion stage of the process being run through at a low feed velocity and the feed velocity being increased abruptly and to a considerable extent at the final stage of the process for upsetting the pieces.

Machines of this kind may be very suitable for quantity production but do not readily lend themselves to the welding of work of various kinds. Cam plates may be changed, but still the velocity, at which the cam shaft rotates, remains constant so that the adaptability provided for by changeable cam plates is limited.

According to my invention the normal or initial feed velocity for the first or fusion stage of the process is imparted to the work carriage by an externally threaded member or rotary spindle, a threaded portion of which is inserted in an internally threaded member or threaded sleeve which is rotatable but held against axial displacement. During the first or fusion stage of the welding process the sleeve is not rotated and the spindle is fed at the normal feed velocity which is a function of its normal rotational velocity. At the final or upsetting stage of the welding process the sleeve is also rotated so that a second velocity is abruptly impressed on the normal feed velocity of the spindle, thereby speeding up the carriage and the work supported therein equally abruptly.

Obviously the two velocity-imparting means might also be operated in reversed sequence.

In the drawing affixed to this specification and forming part thereof a sectional elevation of a machine embodying my invention is illustrated diagrammatically by way of example.

Referring now to the drawing, $h$ is a base plate, $i$ is a fixed upright on the base plate and $a$ is a carriage which is mounted to slide on the base plate. $k, k$ are holders or electrodes in the upright $i$ and the carriage $a$ for supporting the articles to be welded, here shown as a rod $l$ in the upright $i$ and a rod $m$ in the carriage $a$, the two rods being held in abutting relationship.

$b$ is a spindle which is threaded at its inner end $c$ and equipped with a flange or dog $n$ for entraining the carriage $a$. $o$ is a bearing for supporting the outer end of the spindle $b$, $e$ is a worm wheel which is mounted to rotate in the bearing $o$ and splined on the spindle, and $p$ is a shaft with a worm meshing with the worm wheel $e$. The inner threaded end of the spindle $b$ is supported in a bearing $q$ near the upright $i$. $f$ is a worm wheel which is mounted to rotate in the bearing $q$ and $d$ is a threaded sleeve which is inserted in, and keyed to, the boss of the worm wheel $f$ and held against axial displacement by a flange $r$ which is inserted between the bearing $q$ and the upright $i$. Instead of inserting the sleeve $d$ in the boss of the worm wheel $f$ it may be made integral with the worm wheel. $g$ is a shaft with a worm meshing with the worm wheel $f$. Means such as an electric motor or motors (not shown) are provided for rotating the shafts $g$ and $p$ which may be interconnected or independently driven.

The operation of this machine is as follows:

At the beginning or fusion stage of the welding process the carriage $a$ is fed in the direction of the lower arrow in the drawing at the normal, comparatively low feed velocity, the spindle $b$ being rotated by the worm gear $e$. The rotation of the spindle causes it to move in the direction of the upper arrow, i. e. with the carriage $a$, by the cooperation of the threaded spindle end $c$ and the threaded sleeve $d$ which does not rotate at this stage, the spline in the worm wheel $e$ permitting the spindle $b$ to move axially as it is rotated. At the beginning of the upsetting stage the sleeve $d$ is rotated by worm gear $f$ through worm shaft $g$ in the opposite direction to the direction of rotation of spindle $b$ thereby causing an abrupt increase in the velocity at which the spindle $b$ is displaced axially, and at the same time causing an abrupt increase in the feed velocity imparted to carriage $a$. The increase in the feed velocity thus obtained is a function of the velocity at which the sleeve $d$ is rotated.

By suitably determining the time at which upsetting begins, it is possible to vary the welding period and the amount of fusion as desired. Obviously the machine described is much more adaptable than the machines of the type referred to above, which employ a cam plate or a set of changeable cam plates.

I wish it to be understood that I do not desire to be limited to the exact details of construction shown and described, for obvious modifications will occur to those skilled in the art.

I claim:—

1. An electric resistance welding machine comprising a carriage, work-holding means on said carriage, a spindle for feeding said carriage, means for rotating said spindle, a threaded sleeve engaging a threaded portion of said spindle, means for rotating said sleeve, and means for holding said sleeve against axial displacement.

2. An electric resistance welding machine comprising a carriage, work-holding means on said carriage, a spindle for feeding said carriage, means for rotating said spindle, a threaded sleeve engaging a threaded portion of said spindle, means for rotating said sleeve in a direction opposite to the direction of rotation of said spindle, and means for holding said sleeve against axial displacement.

3. An electric resistance welding machine comprising a carriage, work holding means on said carriage, an externally threaded member, an internally threaded member engaging a threaded portion of said externally threaded member, means for attaching one of said members to said carriage, means for holding said other member against axial displacement, and means for rotating each of said threaded members.

4. An electric resistance welding machine comprising a carriage, work holding means on said carriage, an externally threaded member, an internally threaded member engaging a threaded portion of said externally threaded member, means for attaching one of said members to said carriage, means for holding said other member against axial displacement, and means for independently rotating each of said threaded members.

EBERHARD RIETSCH.